United States Patent

Moll et al.

[11] Patent Number: 5,969,062
[45] Date of Patent: Oct. 19, 1999

[54] PROCESS FOR PRODUCING ETHYLENE COPOLYMERS UNDER HIGH PRESSURE

[75] Inventors: Ulrich Moll, St. Martin; Eckard Schauss, Heuchelheim; Roger Klimesch, Alsbach-Hähnlein, all of Germany

[73] Assignee: BASF Aktiengesellschaft, Ludwigshafen, Germany

[21] Appl. No.: 09/051,282

[22] PCT Filed: Sep. 30, 1996

[86] PCT No.: PCT/EP96/04253

§ 371 Date: Apr. 7, 1998

§ 102(e) Date: Apr. 7, 1998

[30] Foreign Application Priority Data

Oct. 14, 1995 [DE] Germany ............... 195 38 294

[51] Int. Cl.⁶ ........................................... C08F 4/64
[52] U.S. Cl. ................. 526/127; 526/160; 526/161; 526/172; 526/348.1; 526/348.6; 526/943; 502/155
[58] Field of Search ................... 526/127, 160, 526/161, 348.1, 943, 172

[56] References Cited

U.S. PATENT DOCUMENTS 5,241,025  8/1993  Hlatky et al. ............... 526/129
5,408,017  4/1995  Turner et al. ............... 526/134

*Primary Examiner*—David W. Wu
*Attorney, Agent, or Firm*—Keil & Weinkauf

[57] ABSTRACT

In a process for preparing copolymers of ethylene with $C_3$–$C_{10}$-alk-1-enes, the polymerization is carried out at pressures in the range from 1000 to 3500 bar and at from 200 to 280° C. in the presence of a catalyst system comprising as active constituents a donor-substituted monocyclopentadienylamido(transition metal) complex compound of the following formula, a compound capable of forming metallocenium ions and, optionally, a trialkylaluminum compound;

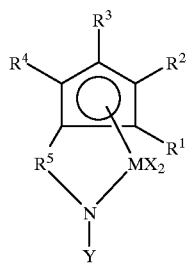

wherein y is $-(CH_2)_n-O-R^{11}$, $-(CH_2-CH_2-O)_n-R^{11}$ or $-(CH_2-O)_n-R^{11}$;

6 Claims, No Drawings

PROCESS FOR PRODUCING ETHYLENE COPOLYMERS UNDER HIGH PRESSURE

The present invention relates to a process for preparing copolymers of ethylene with $C_3$–$C_{10}$-alk-1-enes.

The present invention further relates to the use of the copolymers obtainable in this way for producing fibers, films and moldings and also to the fibers, films and moldings obtainable therefrom.

WO 91/04257 describes a process for preparing olefin polymers using monocyclopentadienyl(transition metal) complexes as catalysts, these complexes being activated with methylaluminoxane. A very high excess of methylaluminoxane is necessary to obtain a sufficiently high productivity, which results in undesirably high aluminum residues in the polymer and nonviable catalyst costs. In order to be able to achieve economically interesting conversions, the reactor temperature in high pressure processes has to be kept at above 200° C. since the polymerization rate and thus also the productivity increase with rising temperature. The methylaluminoxane-activated catalyst systems mentioned in WO 91/04257 display a drastic fall in productivity and at the same time a decrease in the molecular weight of the polymers obtained even at temperatures above 180° C.

WO 93/25590 describes a process for preparing polyolefins under high pressure and high temperature conditions, in which monocyclopentadienyl(transition metal) complexes which are activated with ionic compounds are used as catalysts. A disadvantage here is that at the polymerization temperatures of over 200° C. which are necessary for economical conversions the polyolefins have relatively high densities, relatively low molecular weights or a broad molecular weight distribution.

The same disadvantages are displayed by the ethylene copolymers prepared in EP-A 612 768 and EP-A 612 769, in which the copolymers are obtained in a high pressure process at reaction temperatures above 200° C. using biscyclopentadienyl(transition metal) complexes, ionic compounds and organoaluminum compounds as catalyst constituents.

U.S. Pat. No. 5,272,236 describes ethylene copolymers which are prepared in a solution process using monocyclopentadienyl(transition metal) complexes and ionic compounds as catalyst constituents.

These polymers too have a relatively high density at temperatures above 200° C.

It is an object of the present invention to provide a process for preparing copolymers of ethylene with $C_3$–$C_{10}$-alk-1-enes which makes possible high conversions at a low catalyst consumption, which can be carried out simply in process terms and in which the resulting ethylene copolymers have low densities, high molecular weights and a narrow molecular weight distribution.

We have found that this object is achieved by a process for preparing copolymers of ethylene with $C_3$–$C_{10}$-alk-1-enes, wherein the polymerization is carried out at pressures in the range from 1000 to 3500 bar and at from 200 to 280° C. in the presence of a catalyst system comprising as active constituents a donor-substituted monocyclopentadienylamido(transition metal) complex, a compound capable of forming metallocenium ions and, if desired, a trialkylaluminum compound.

Furthermore, we have found the use of the copolymers obtainable in this way for producing fibers, films and moldings and also the fibers, films and moldings obtainable therefrom.

In the process of the present invention, comonomers used are $C_3$–$C_{10}$-alk-1-enes, preferably propene, 1-butene, 1-hexene and 1-octene, in particular 1-butene and 1-hexene. A plurality of comonomers can also be used, but preference is given to using only ethylene and one comonomer. The amount of comonomers used can be in the range from 20 to 80% by weight, preferably in the range from 40 to 60% by weight. The sum of the percentages by weight of the ethylene and the comonomers used is always 100.

The process of the present invention is carried out at pressures in the range from 1000 to 3500 bar, preferably from 1200 to 3000 bar, and at from 200 to 280° C., preferably from 220 to 260° C. The reaction times are not critical per se; from 30 to 300 seconds have been found to be particularly useful, preferably from 60 to 180 seconds.

In the process of the present invention, one catalyst constituent used is a donor-substituted monocyclopentadienylamido(transition metal) complex. It is also possible to use mixtures of a plurality of these complexes, but preference is given to using only one. Preferred donor-substituted monocyclopentadienylamido (transition metal) complexes are those of the formula I:

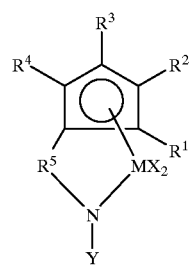

I where the substituents have the following meanings:

M is titanium, zirconium or hafnium,

X is fluorine, chlorine, bromine, iodine, hydrogen, $C_1$–$C_{10}$-alkyl or $C_6$–$C_{15}$-aryl, $R^1$ to $R^4$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a cyclic group having from 4 to 15 carbon atoms, or $Si(R^6)_3$ where $R^6$ is $C_1$–$C_{10}$-alkyl, $C_3$–$C_{10}$-cycloalkyl or $C_6$–$C_{15}$-aryl, $R^5$ is

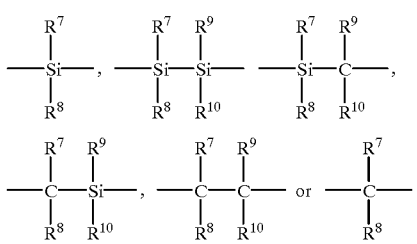

where $R^7$ to $R^{10}$ are hydrogen, $C_1$–$C_{10}$-alkyl, $C_6$–$C_{15}$-aryl or $R^7$ and $R^9$ or $R^8$ and $R^{10}$ in each case together with the atoms connecting them, form a ring, Y is

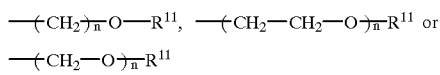

where

R$^{11}$ is hydrogen, C$_1$–C$_6$-alkyl or C$_6$–C$_{15}$-aryl which may in turn be substituted by C$_1$–C$_4$-alkyl groups
and n is 1, 2 or 3.

Particular preference is given to complexes of the formula I in which

M is titanium,

X is chlorine or C$_1$–C$_4$-alkyl,

R$^1$ to R$^4$ are hydrogen, C$_1$–C$_6$-alkyl, in particular methyl, ethyl, propyl, n-butyl and tert-butyl, phenyl or two adjacent radicals together form a cyclic group having from 4 to 10 carbon atoms, R$^5$ is

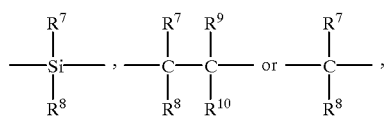

where

R$^7$ to R$^{10}$ are hydrogen or C$_1$–C$_6$-alkyl,

Y is

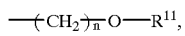

where

R$^{11}$ is C$_1$–C$_4$-alkyl, in particular methyl
and n is 2.

Particularly preferred compounds of the formula I are
[(methoxyethylamido)dimethylsilyl(tetramethylcyclopentadienyl)]dichlorotitanium,
[(methoxyethylamido)dimethylsilyl(tetramethylcyclopentadienyl)]dimethyltitanium,
[(methoxyethylamido)dimethylsilyl(3-tert-butylcyclopentadienyl)]dichlorotitanium,
[(methoxyethylamido)dimethylsilyl(3-tert-butylcyclopentadienyl)]dimethyltitanium,
[(methoxyethylamido)dimethylsilyl(cyclopentadienyl)]dichlorotitanium,
[(methoxyethylamido)dimethylsilyl(cyclopentadienyl)]dimethyltitanium.

The complexes of the formula I and processes for their preparation are known per se and described, for example, in Organometallics 1995, Vol. 14, No. 7, pages 3129 to 3131.

The preferred (methoxyethylamido)dimethylsilyl compounds of the formula I can be prepared, for example, by reacting the appropriately substituted (chlorodimethylsilyl)cyclopentadiene with lithium methoxyethylamide to give the correspondingly substituted [(methoxyethylamino)dimethylsilyl]cyclopentadiene and then reacting this with n-butyllithium, TiCl$_3$(THF)$_3$ and PbCl$_2$. To prepare the corresponding dimethyltitanium compound, preference is given to adding methylmagnesium chloride to the dichlorotitanium compound formed.

As compound capable of forming metallocenium ions, preference is given, in the process of the present invention, to using a coordination compound selected from the group consisting of strong, uncharged Lewis acids, ionic compounds containing Lewis acid cations and ionic compounds containing Brönsted acids as cations.

As strong, uncharged Lewis acids, preference is given to compounds of the formula II $$M^1X^1X^2X^3 \qquad \qquad II$$

where

M$^1$ is an element of main group III of the Periodic Table, in particular B, Al or Ga, preferably B, X$^1$, X$^2$ and X$^3$ are hydrogen, C$_1$–C$_{10}$-alkyl, C$_6$–C$_{15}$-aryl, alkylaryl, arylalkyl, haloalkyl or haloaryl each having from 1 to 10 carbon atoms in the alkyl radical and from 6 to 20 carbon atoms in the aryl radical or fluorine, chlorine, bromine or iodine, in particular haloaryl, preferably pentafluorophenyl.

Particular preference is given to compounds of the formula II in which X$^1$, X$^2$ and X$^3$ are identical, preferably tris(pentafluorophenyl)borane. These compounds and processes for their preparation are known per se and described, for example, in WO 93/3067.

Suitable ionic compounds containing Lewis acid cations are compounds of the formula III

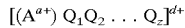

where

A is an element of main groups I to VI or transition groups I to VIII of the Periodic Table, Q$_1$ to Q$_z$ are singly negatively charged groups such as C$_1$–C$_{28}$-alkyl, C$_6$–C$_{15}$-aryl, alkylaryl, arylalkyl, haloalkyl, haloaryl each having from 6 to 20 carbon atoms in the aryl part and from 1 to 28 carbon atoms in the alkyl part, C$_1$–C$_{10}$-cycloalkyl which may bear C$_1$–C$_{10}$-alkyl groups as substituents, halogen, C$_1$–C$_{28}$-alkoxy, C$_6$–C$_{15}$-aryloxy, silyl or mercaptyl groups, a is an integer from 1 to 6, z is an integer from 0 to 5 and d is the difference a–z, but d is greater than or equal to 1.

Particularly suitable Lewis acid cations are carbonium cations, oxonium cations and sulfonium cations and also cationic transition metal complexes. Particular mention may be made of the triphenylmethyl cation, the silver cation and the 1,1'-dimethylferrocenyl cation.

They preferably have noncoordinating counterions, in particular boron compounds as are also mentioned in WO 91/09882, preferably tetrakis(pentafluorophenyl)borate.

Ionic compounds containing Brönsted acids as cations and preferably likewise noncoordinating counterions are mentioned in WO 93/3067; the preferred cation is N,N-dimethylanilinium.

As compound capable of forming metallocenium ions, particular preference is given to using N,N-dimethylanilinium tetrakis(pentafluorophenyl)borate.

If desired, a trialkylaluminum compound can be additionally used in the process of the present invention. Preference is given to using a trialkylaluminum compound when the donor-substituted monocyclopentadienylamido(transition metal) complex is in the form of a transition metal halide complex, ie. when X in the formula I is halogen.

The trialkylaluminum compounds used can be ones of the formula VI $AlR^{12}R^{13}R^{14}$  IV where $R^{12}$ to $R^{14}$ are $C_1$–$C_{12}$-alkyl.

Preferably, the radicals $R^{12}$ to $R^{14}$ are identical and are $C_1$–$C_6$-alkyl, in particular methyl, ethyl, isobutyl or hexyl.

It has been found to be particularly useful for the molar ratio of boron from the compound capable of forming metallocenium ions to transition metal from the donor-substituted monocyclopentadienylamido(transition metal) complex to be in the range from 0.1:1 to 10:1, in particular in the range from 1:1 to 5:1.

If a trialkylaluminum compound is used, the molar ratio of aluminum from the trialkylaluminum compound to transition metal from the donor-substituted monocyclopentadienylamido(transition metal) complex is preferably in the range from 10,000:1 to 1:1, in particular in the range from 600:1 to 200:1.

The process of the present invention can be carried out in the reactors customarily used for high pressure polymerization, for example in autoclaves or, in particular, in high-pressure tube reactors.

The process of the present invention can be carried out by mixing the active constituents of the catalyst system and then metering the catalyst system into the reactor, preferably continuously, with the monomers being introduced under pressure into the reactor, likewise preferably continuously.

The catalyst constituents are preferably mixed by adding the compound capable of forming metallocenium ions to a solution of the donor-substituted monocyclopentadienylamido(transition metal) complex. Suitable solvents are hydrocarbons, preferably aromatic hydrocarbons, for example toluene.

If a trialkylaluminum is also used as catalyst constituent, it has been found to be particularly useful to add a solution of the trialkylaluminum, preferably in an aliphatic hydrocarbon, eg. heptane, as solvent, to a toluene solution of the donor-substituted monocyclopentadienylamido (transition metal) complex. The compound capable of forming metallocenium ions can subsequently be added thereto.

The process of the present invention gives high conversions at a low catalyst consumption, can be carried out simply in process terms and the resulting ethylene copolymers have low densities, high molecular weights and narrow molecular weight distributions $M_w/M_n$ ($M_w$=weight average value, $M_n$=number average value).

Furthermore, the resulting ethylene copolymers have a high comonomer content in the polymer and have good flowability.

EXAMPLES

Examples 1 to 6

Preparation of the donor-substituted monocyclopentadienylamido(transition metal) complexes Example 1

Preparation of [(methoxyethylamido)dimethylsilyl (tetramethylcyclopentadienyl)]dichlorotitanium (I1)

The synthesis was carried out as described in Organometallics, Vol. 14, No. 7, 1995, pages 3129 to 3131.

2.00 g (24.67 mmol) of lithium methoxyethylamide were added a little at a time at 0° C. to a solution of 5.30 g (24.70 mmol) of (chlorodimethylsilyl)tetramethylcyclopentadiene in 40 ml of dry pentane and the mixture was stirred for 16 hours at room temperature. The pale yellow reaction solution was filtered to remove the precipitated lithium chloride and the pentane was removed under an oil pump vacuum. Subsequent distillation of the remaining oil gave [(methoxyethylamino)dimethylsilyl] tetramethylcyclopentadiene in the form of a hydrolysis-sensitive, greenish yellow oil. Yield: 5.26 g (76%); boiling point: 70–77° C./$10^{-2}$ torr.

4 ml (10 mmol) of 2.5 M butyllithium in hexane were added at 0° C. to 1.40 g (5 mmol) of [(methoxyethylamino) dimethylsilyl]tetraethylcyclopentadiene in 30 ml of pentane. After 24 hours, the precipitated dilithium salt was filtered off from the supernatant solution.

After dissolving in 40 ml of THF and cooling the solution to 78° C., 1.85 g (5 mmol) of $TiCl_3(THF)_3$ were added all at once. After stirring for 2 hours at –10° C. and completely dissolving the $TiCl_3(THF)_3$, the reaction mixture had a dark greenish blue color. 1.50 g (5.4 mmol) of dried $PbCl_2$ were added and the mixture was stirred further for 12 hours at room temperature, with the color changing to orange-brown. The THF was evaporated under reduced pressure and the solid brown residue was extracted with 50 ml of pentane. After concentrating and filtering the extract, 1.72 g (92%) of orange-brown, pulverulent crude product was obtained. Recrystallization from 30 ml of ether at –30° C. gave 700 mg of [(methoxyethylamido)dimethylsilyl (tetramethylcyclopentadienyl)]dichlorotitanium in the form of honey-yellow crystals having a melting point of 98° C.

$^1$H-NMR ($C_6D_6$, 25° C.): δ 4.34 (t, 2H), 3.08 (t, 2H), 2.90 (s, 3H), 2.02 (s, 6H), 2.00 (s, 6H), 0.46 (s, 6H) ppm, $^{13}$C-NMR ($C_6D_6$, 35° C.): δ 140.95, 135.75, 104.62, 72.46, 57.85, 54.86, 16.16, 12.89, 2.94 ppm $C_{14}H_{25}Cl_2NOSiTi$ Calc.: C 45.42 H 06.81 N 03.78 370.23 Found: C 45.10 H 06.71 N 03.77

Example 2

Preparation of [(methoxyethylamido)dimethylsilyl(tert-butylcyclopentadienyl)]dichlorotitanium (I2)

The procedure of Example 1 was repeated, but (chlorodimethylsilyl)tert-butylcyclopentadiene was used in place of (chlorodimethylsilyl)tetramethylcyclopentadiene.

Example 3

Preparation of [(methoxyethylamido)dimethylsilyl (cyclopentadienyl)]dichlorotitanium (I3)

The procedure of Example 1 was repeated, but (chlorodimethylsilyl)cyclopentadiene was used in place of (chlorodimethylsilyl)tetramethylcyclopentadiene.

Example 4

Preparation of [(methoxyethylamido)dimethylsilyl (tetramethylcyclopentadienyl)]dimethyltitanium (I4)

At –78° C., 0.67 ml (2 mmol) of a 3.0 M solution of methylmagnesium chloride in THF was added to 370 mg (1 mmol) of [(methoxyethylamido)dimethylsilyl (tetramethylcyclopentadienyl)]dichlorotitanium (I1) (prepared in Example 1). The reaction mixture was allowed to thaw slowly to room temperature and was stirred further for 3 hours. During this time, the original orange color changed to pale yellow. The THF was taken off under reduced pressure and the remaining yellow solid was extracted with 20 ml of pentane. The pentane solution was filtered and the solvent was removed. This gave a quantitative yield of I4 as a yellow oil.

$^1$H-NMR (C$_6$D$_6$, 25° C.): δ 4.30 (t, 2H), 3.38 (t, 2H), 3.12 (s, 3H), 2.00 (s, 6H), 2.00 (s, 6H), 1.88 (s, 6H), 0.40 (s, 6H), 0.39 (s, 6H) ppm, $^{13}$C-NMR (C$_6$D$_6$, 25° C.): δ 134.11, 129.34, 97.38, 75.27, 58.17, 50.53, 49.68, 15.13, 11.34, 3.35 ppm

Example 5

Preparation of [(methoxyethylamido)dimethylsilyl(tert-butylcyclopentadienyl)]dimethyltitanium (I5)

The procedure of Example 4 was repeated, but (I2) was used in place of (I1).

Example 6

Preparation of [(methoxyethylamido)dimethylsilyl (cyclopentadienyl)]dimethyltitanium (I6)

The procedure of Example 4 was repeated, but (I3) was used in place of (I1).

Examples 7 to 14

Preparation of ethylene-1-butene copolymers

Examples 7 to 9

Preparation of ethylene-1-butene copolymers in an autoclave using (I1) to (I3)

40% by weight of ethylene and 60% by weight of 1-butene were introduced continuously under pressure into a 1 l high-pressure autoclave fitted with a stirring motor, with the pressure in the interior of the autoclave being regulated to 1500 bar.

In a separate make-up vessel, a solution of 200 mmol of triisobutylaluminum in heptane (30% strength by weight) was in each case added to a solution of 0.5 mmol of (I1) (Example 7), 0.5 mmol of (I2) (Example 8) or 0.5 mmol of (I3) (Example 9) in 10 l of toluene in a molar ratio of Al:Ti=400:1. The catalyst was activated by subsequently adding 480 mg of solid N,N-dimethylanilinium tetrakis (pentafluorophenyl)borate (molar ratio of B:Ti=1.2:1). The resulting catalyst solution was continuously metered into the autoclave (1500 ml/h) and the reaction temperature was maintained at 230° C.

Example 10

Preparation of ethylene-1-butene copolymer in a tube reactor using (I1)

40% by weight of ethylene and 60% by weight of 1-butene were introduced continuously under pressure into a high-pressure tube reactor (length: 620 m, diameter: 15 mm, throughput: 700 kg/h), with the pressure in the interior of the tube reactor being regulated to 1700 bar. In a separate make-up vessel, a catalyst solution containing 0.3 mmol of (I1) was prepared as described in Examples 7 to 9 and this was metered continuously into the tube reactor (1500 ml/h). The reaction temperature was maintained at 235° C.

Examples 11 to 13

Preparation of ethylene-1-butene copolymers in an autoclave using (I4) to (I6)

The procedure of Examples 7 to 9 was repeated, but the catalyst solutions were prepared by adding, in each case, 480 mg of N,N-dimethylanilinium tetrakis(pentafluorophenyl) borate to a solution of 0.5 mmol of (I4) (Example 11), 0.5 mmol of (I5) (Example 12) or 0.5 mmol of (I6) (Example 13) in 10 l of toluene (molar ratio of B:Ti=1.2:1).

Example 14

Preparation of ethylene-1-butene copolymer in a tube reactor using (I4)

The procedure of Example 10 was repeated, but a catalyst solution containing (I4), which had been prepared as described in Examples 11 to 13, was used.

Comparative Examples C1 to C4

Preparation of ethylene-1-butene copolymers in an autoclave

The procedure of Examples 7 to 9 was repeated, but the (I1), (I2) or (I3) was replaced by [(N,N-dimethylethylenediamido)dimethylsilyl (tetramethylcyclopentadienyl)]dichlorotitanium (Comparative Example C1), [(N,N-dimethylethylenediamido)dimethylsilyl(tert-butylcyclopentadienyl)]dichlorotitanium (Comparative Example C2), [(N,N-dimethylethylenediamido) dimethylsilyl(cyclopentadienyl)]dichlorotitanium (Comparative Example C3) and [(tert-butylamido) dimethylsilyl(tetramethylcyclopentadienyl)] dichlorotitanium (Comparative Example C4).

Comparative Examples C5 to C8

Preparation of ethylene-1-butene copolymers in an autoclave

The procedure of Examples 11 to 13 was repeated, but the (I4), (I5) or (I6) was replaced by [(N,N-dimethylethylenediamido)dimethylsilyl (tetramethylcyclopentadienyl)]dimethyltitanium (Comparative Example C5), [(N,N-dimethylethylenediamido)dimethylsilyl(tert-butylcyclopentadienyl)]dimethyltitanium (Comparative Example C6), [(N,N-dimethylethylenediamido) dimethylsilyl(cyclopentadienyl)]dimethyltitanium (Comparative Example C7) and [(tert-butylamido) dimethylsilyl(tetramethylcyclopentadienyl)] dimethyltitanium (Comparative Example C8).

The properties of the copolymers are shown in the table below.

The MFI (Melt Flow Index) was determined in accordance with DIN 53 735 (load: 2.16 kg), the HLMI was likewise determined in accordance with DIN 53 735 (load: 21.6 kg). The weight average molecular weights $M_w$ and number average molecular weights $M_n$ were determined by GPC measurements (Gel Permeation Chromatography) and the density was determined in accordance with DIN 53 479.

TABLE

| Example | 1-Butene content of the copolymer [% by weight] | Productivity [kg/mmol Ti × h] | MFI [g/10 min] | $M_w$ | $M_w/M_n$ | Density [g/cm$^3$] |
|---|---|---|---|---|---|---|
| 7  | 18.4 | 155 | 3.0* | 204 871 | 2.0 | 0.888 |
| 8  | 18.2 | 119 | 3.1* | 202 378 | 2.1 | 0.889 |
| 9  | 17.8 | 102 | 0.24 | 163 237 | 2.4 | 0.892 |
| 10 | 18.7 | 176 | 0.13 | 172 523 | 2.4 | 0.881 |
| 11 | 18.3 | 114 | 3.0* | 204 371 | 2.1 | 0.887 |
| 12 | 18.1 | 109 | 3.1* | 201 847 | 1.9 | 0.889 |
| 13 | 17.9 | 98  | 0.23 | 164 237 | 2.5 | 0.891 |
| 14 | 18.6 | 134 | 0.12 | 171 523 | 2.3 | 0.886 |
| C1 | 1.9 | 110 | 0.15 | 168 474 | 1.8 | 0.932 |
| C2 | 0.6 | 99  | 0.28 | 155 265 | 2.3 | 0.951 |
| C3 | 0.8 | 91  | 0.32 | 133 349 | 1.9 | 0.942 |
| C4 | 8.8 | 55  | 42   | 41 864  | 10.9 | 0.918 |
| C5 | 1.7 | 103 | 0.14 | 169 474 | 1.7 | 0.937 |
| C6 | o.5 | 93  | 0.29 | 153 265 | 2.2 | 0.953 |
| C7 | 0.7 | 89  | 0.34 | 131 349 | 1.8 | 0.946 |
| C8 | 8.9 | 41  | 43   | 40 864  | 10.3 | 0.918 |

*HLMI

We claim:

1. A process for preparing copolymers of ethylene with $C_3$–$C_{10}$-alk-1-enes, wherein the polymerization is carried out at pressures in the range from 1000 to 3500 bar and at from 200 to 280° C. in the presence of a catalyst system comprising as active constituents a donor-substituted monocyclopentadienylamido(transition metal) complex compound of the formula I:

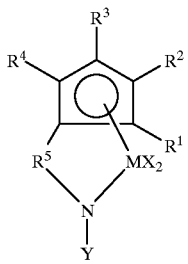

where the substituents have the following meanings:

M is titanium, zirconium or hafnium,

X is fluorine, chlorine, bromine, iodine, hydrogen, $C_1$–$C_{10}$-alkyl or $C_6$–$C_{15}$-aryl, $R^1$ to $R^4$ are hydrogen, $C_1$–$C_{10}$-alkyl, 5- to 7-membered cycloalkyl which may in turn bear a $C_1$–$C_{10}$-alkyl group as substituent, $C_6$–$C_{15}$-aryl or arylalkyl, where two adjacent radicals may also together form a cyclic group having from 4 to 15 carbon atoms, or $Si(R^6)_3$ where $R^6$ is $C_1$–$C_{10}$-alkyl, $C_3$–$C_{10}$-cycloalkyl or $C_6$–$C_{15}$-aryl, $R^5$ is

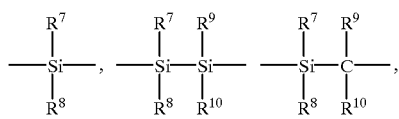

-continued

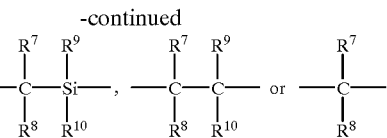

$R^7$ to $R^{10}$ are hydrogen, $C_1$–$C_{10}$-alkyl, $C_6$–$C_{15}$-aryl or $R^7$ and $R^9$ or $R^8$ and $R^{10}$, in each case together with the atoms connecting them, form a ring, Y is

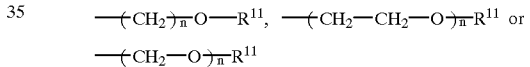

where $R^{11}$ is hydrogen, $C_1$–$C_6$-alkyl or $C_6$–$C_{15}$-aryl which may in turn be substituted by $C_1$–$C_4$-alkyl groups and n is 1, 2 or 3, a compound capable of forming metallocenium ions and, optionally, a trialkylaluminum compound.

2. A process as claimed in claim 1, wherein the polymerization is carried out at pressures in the range from 1200 to 3000 bar.

3. A process as claimed in claim 1, wherein the polymerization is carried out at from 220 to 260° C.

4. A process as claimed in claim 1, wherein the polymerization is carried out in a high-pressure tube reactor.

5. A process as claimed in claim 1, wherein the compound capable of forming metallocenium ions which is used is a coordination compound selected from the group consisting of strong, uncharged Lewis acids, ionic compounds containing Lewis acid cations and ionic compounds containing Brönsted acids as cations.

6. A fiber, film or molding comprising a copolymer prepared as claimed in claim 1.

* * * * *

UNITED STATES PATENT AND TRADEMARK OFFICE
CERTIFICATE OF CORRECTION

PATENT NO.: 5,969,062

DATED: October 19, 1999

INVENTOR(S): MOLL et al.

It is certified that error appears in the above-identified patent and that said Letters Patent is hereby corrected as shown below:

On the cover sheet, insert the following missing information:

--[87]   PCT Pub. No.:  WO 97/14724
         PCT Pub. Date:  Apr. 24, 1997--.

In the abstract, first line after the formula, "y" should be --Y--.

Col. 10, claim 1, after the formulae shown at lines 24-28, insert --where--.

Signed and Sealed this

First Day of August, 2000

Attest:

Q. TODD DICKINSON

Attesting Officer

Director of Patents and Trademarks